INVENTOR.
LOEBE JULIE
ATTORNEY

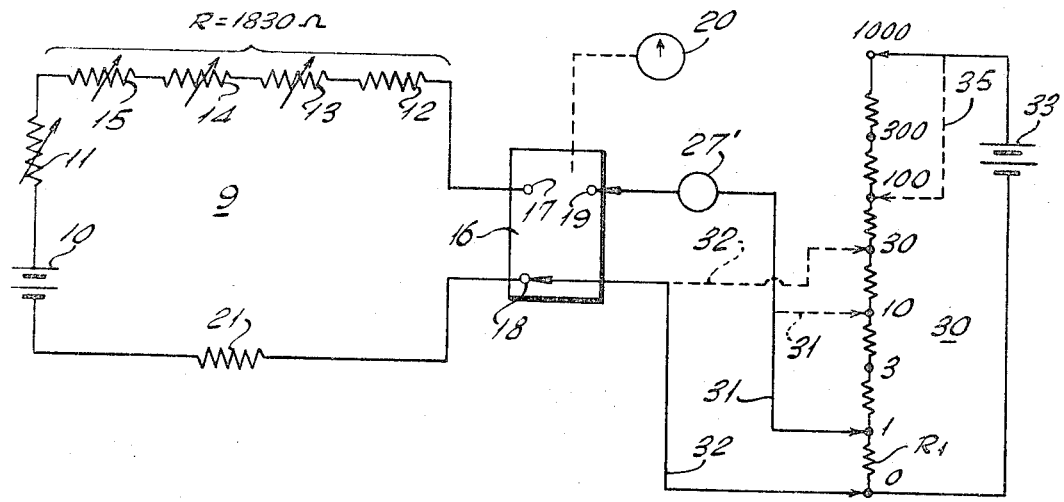
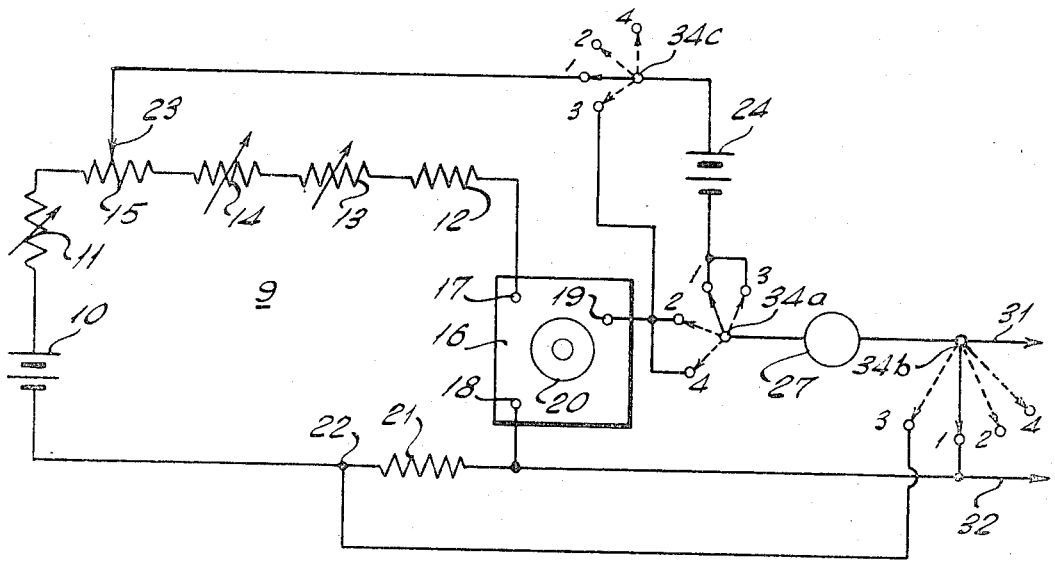

United States Patent Office 3,416,084
Patented Dec. 10, 1968

3,416,084
PRECISION POTENTIOMETER CIRCUIT AND
METHOD FOR ESTABLISHING SAME
Loebe Julie, Riverdale, N.Y., assignor to Julie Research Laboratories, Inc., New York, N.Y., a corporation of New York
Filed Sept. 12, 1963, Ser. No. 308,492
10 Claims. (Cl. 324—98)

The instant invention relates to a precision self-calibrating potentiometer circuit and a method for establishing same.

A potentiometer circuit is a device used for the comparison of voltages and incorporates an absolute standard DC power cell to provide the accurate basis for potentiometer measurements. The typical prior art potentiometer circuit includes a slide wire in series with a working battery and a variable resistor. A galvanometer in series with the standard cell is placed across the input of the slide wire. The variable resistor is adjusted to null the galvanometer and whereby the slide wire is standardized to a specific voltage per setting of slide wire arm. Usually, the voltage across the slide wire is established so that the slide wire arm is direct reading, for example 2.00 volts for 200 centimeters in length. An unknown EMF or voltage parameter may be calibrated or otherwise measured by the foregoing potentiometer circuit by means of connecting same in place of the standard cell and adjusting the slide wire arm until the galvanometer nulls. This indicates a zero current through the galvanometer and thus the unknown EMF is balanced by the voltage drop from the slide wire arm to the low end of the potentiometer output. By having the potentiometer or slide wire calibrated for direct readings, as previously indicated, one can read the voltage of the unknown EMF directly from the slide wire arm. As known in the art, the potentiometer is basically a ratio instrument. Hence, the unknown voltage is measured in terms of a reference voltage by means of the ratio of the resistances required to provide the particular voltage drop in order to balance two voltages, i.e. the unknown EMF agaist the output voltage drop across the slide wire at null.

For many applications, calibration of voltage parameters as described herein is sufficiently accurate. However, when one seeks to establish or calibrate unknown voltage parameters to the degree of accuracies of two parts per million ± one digit, the foregoing described prior art potentiometer system is inadequate because it cannot reliably achieve such accuracies. The errors involved are basically scaling errors and ratio resistance errors which preclude one from knowing whether or not the potentiometer is reliably accurate to the degree of a few parts per million.

The instant invention provides a potentiometer circuit which reliably achieves voltage calibrations within accuracies and precision of two parts per million ± one digit. This is brought about by establishing a potentiometer circuit made of two distant sections. The first section is a standardizing portion of resistors of selected value. The second section is a three terminal voltage divider, wherein the latter is characterized by an input impedance of fixed and known value, and further characterized by a linear transfer ratio. By reason of selecting the standardizing portion of the potentiometer of selected value in proper relationship with the value of the fixed input impedance of the divider, one is able to optimize potentiometer circuit errors to a minimum and thus achieve the accuracies in in order of a few parts per million (p.p.m.).

The invention also contemplates incorporating impedance means in series with the divider input, wherein said means is characterized by a fixed value and in suitable proportion to the input impedance of the voltage divider, whereby the potentiometer is rendered self-calibrating against scaling errors. It will also be seen that by reason of use of a potentiometer circuit as contemplated herein, errors introduced by potentiometer ratio resistances may be reliably minimized and, in addition, calibrated for correction.

It is a principal object of the invention to provide a self-calibrating potentiometer circuit and a method of establishing same for the purpose of establishing or calibrating voltage parameters within reliable accuracies of a few parts per million.

It is a further object of the invention to provide a potentiometer circuit consisting mainly of a standardizing resistor portion in series with the input terminals of a voltage divider, wherein the voltage divider is characterized by a linear transfer ratio and a fixed input impedance of known value, wherein the standardizing resistor portion of the circuit is chosen of selected value in order to optimize reduction of potentiometer errors.

It is a further object of the invention to provide impedance means in series with the foregoing mentioned voltage divider, wherein said impedance means has a fixed resistance of known value to render the potentiometer circuit self-calibrating against scaling errors.

It is a further object of the invention to establish a potentiometer circuit capable of calibration with respect to ratio resistance errors.

Further objects and advantages will become apparent from the following description of the invention taken in conjunction with the figures, in which.

Figure 2:
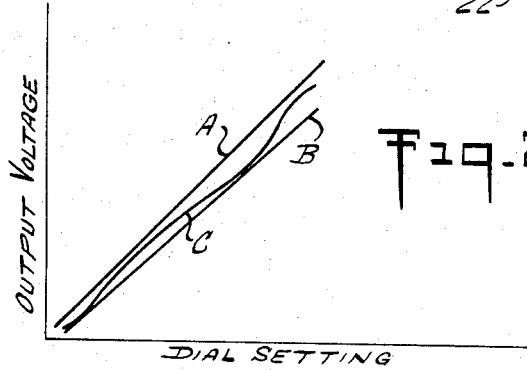

FIG. 2 establishes a set of curves illustrating voltage divider dial settings against actual voltage output of the potentiometer circuit;

FIG. 3 illustrates the potentiometer circuit in operative relationship with a voltbox; and FIG. 4 is a schematic illustration of the invention incorporating a slightly different switching embodiment.

Figure 1:
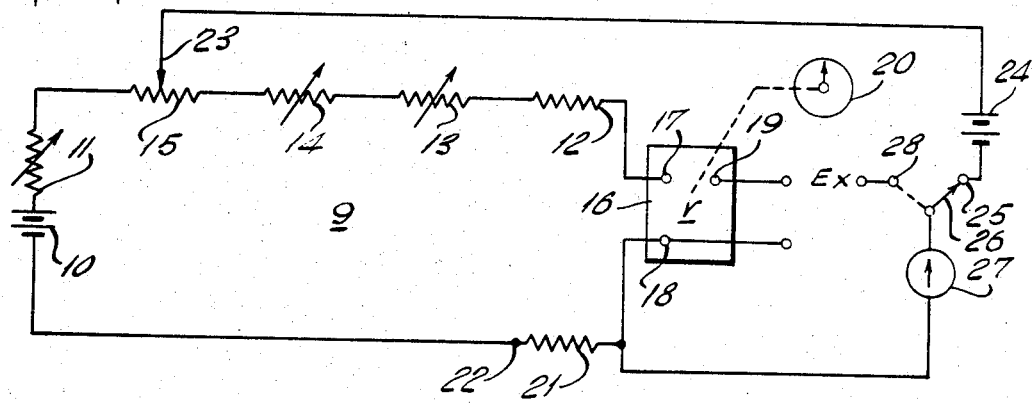
FIG. 1 depicts a circuit diagram of the potentiometer circuit in accordance with the invention.

FIG. 1 indicates the potentiometer circuit 9 in accordance with the invention. The positive side of a working battery source 10 is in series with a variable resistor 11. To enhance accuracy of the system, battery source 10 may consist of thermally-lagged mercury cells and resistor 11 may be a combination of course and fine adjustable control resistor. A series connected group of standardizing resistors 12, 13, 14 and 15 are connected in series with resistor 11. In a preferred embodiment of the invention, the standardizing resistors were selected as follows: resistor 12 is a fixed resistor having a value of 1700 ohms ±0.01%; resistor 13 is a ten position, 1 ohm resistor variable in 0.1 ohm steps; resistor 14 is a ten position, 10 ohm resistor variable in 1 ohm steps; and resistor 15 is a thirty position, 290 ohm resistor variable in 10 ohm steps. The resistance varying element 16 is a three terminal voltage divider characterized by the fixed input impedance of known value and, further, characterized by a linear transfer ratio $r$. The terminals 17, 18 depict the input terminals of divider 16. One may refer to co-pending application Ser. No. 195,680, now Letters Patent 3,179,880, issued Apr. 20, 1965, filed May 18, 1962 and entitled "Impedance Measuring Apparatus and Method" for further information concerning a voltage divider characterized as described herein. As noted in said co-pending application, the transfer ratio and thus the output resistance at terminal 19 of voltage divider 16 may be varied linearly by linear adjustment of a dial 20. It will be understood that adjustment of dial 20 varies the internal impedances constituting divider 16 so as to change its transfer ratio, whereby its output impedance, terminal 19 to terminal 18, will vary accordingly for a direct reading along dial 20.

Input terminal 17 of voltage divider 16 is in series with the standardizing resistors 12 to 15. Voltage divider 16 may be a six decade Kelvin-Varley voltage divider accurate to 0.0001%, i.e., 1 part per million (1 p.p.m.). A resistor 21 is in series with the low end terminal 18 of voltage divider 16. Junction 22 at the other end of resistor 21 connects back to battery 10 to complete the electrical circuit. Resistor 21 has a value of 10K ohms ±0.001% and is used in self-calibration of the potentiometer circuit as described hereinafter.

A lead wire connects a variable tap arm 23 along resistor 15 to the positive side of an absolute standard DC source 24. Source 24 may be three saturated standard cells in an isothermal air bath to yield an absolute standard of 1.01830 volts at an accuracy of 1 part per million (1 p.p.m.). The negative side of source 24 is connected to a terminal 25 of a switch 26. A null galvanometer 27 is in series with terminal 25 and the low side 18 of voltage divider 16. With switch 26 connecting to terminal 25, galvanometer 27 is electrically in series with standard 24. When switch 26 is moved to its alternate position to contact switch terminal 28, galvanometer 27 is then in series with a pair of test terminals indicated as "$E_x$" across which an unknown EMF or other voltage parameter is inserted in order to calibrate or measure said unknown EMF. The balancing voltage for measuring the unknown EMF is taken from the output side of voltage divider 16, i.e., across terminals 19-18.

In order to use the potentiometer system as shown in FIG. 1, one must first calibrate voltage divider 16. To carry this out, switch 26 is placed in a position to contact terminal 25. Assuming that standard 24 provides 1.01830 volts, and that the input impedance of divider 16 is selected to be 100K ohms, the standardizing resistors 12, 13, 14 and 15 are adjusted to provide an aggregate series resistance of 1830 ohms from tap arm 23 to terminal 17. Resistor 11 is varied until galvanometer 27 nulls. When galvanometer 27 nulls, this indicates a zero current flow through the galvanometer. In other words, the voltage of standard 24 is balanced by an equal voltage drop across the standardizing resistors 12, 13, 14, 15 and the $Z_{in}$ of voltage divider 16, i.e., from tap arm 23 to the low side 18 of voltage divider 16. Since R12 to R15 (from tap arm 23 to terminal 17) were selected to be 1830 ohms, and the input to R16 was selected to be 100K ohms, the total resistance from point 23 to low side 18 of divider 16 is 101,830 ohms with a voltage of 1.01830 volt across same at null. The total voltage across voltage divider 16 is:

$$V_d = \frac{R_d}{R_s + R_d} \times E_s \qquad (1)$$

where $V_d$ = voltage across voltage divider 16;
$R_d$ = input resistance of voltage divider 16;
$R_s$ = resistance of standardizing resistors 12, 13, 14, and 15 from tap arm 23 to junction 17; and
$E_s$ = voltage of standard source.

From the foregoing values assigned to the parameters, the voltage across divider 16 will be 1 volt from input terminal 17 to its low side junction 18. The foregoing provides an extremely high precision and accurate value of 1 volt across the input of divider 16. It is seen from Equation 1 that the voltage across divider 16 is a function of an absolute standard voltage $E_s$ and a ratio of resistances.

By selecting the resistance value of the standardizing resistors to be relatively small in comparison to the input resistance of divider 16, the inherent error of the foregoing potentiometer circuit is effectively attenuated. For example, the ratio of the standardizing resistors to the $Z_{in}$ of divider 16 is:

$$\frac{1830}{100K} \times 100 = 1.83\% \doteq 2\% \qquad (2)$$

It will be shown that by selecting a resistance ratio of approximately 2%, as indicated by Equation 2, any error of either the standardizing resistors and/or the voltage divider input resistance will tend to minimize a change of the actual value of $V_d$ from one volt, wherein the voltage error is attenuated by a factor of approximately 50. This is seen from the following: Let $V_d'$ be the actual voltage across the input to divider 16, hence:

$$V_d' = \left(\frac{R_d'}{R_s' + R_d'}\right) \times (E_s) = \left(\frac{1}{1 + \frac{R_s'}{R_d'}}\right) \times (E_s) \qquad (3)$$

where $R_d' = R_d[1 + e_d]$; and
$R_s' = [(E_s - 1)R_d][1 + e_s] \qquad (4)$ where $e_d$ is the error of the voltage divider in a fraction of the entire resistance of the divider $R_d$; and $e_s$ is the error of the standardizing resistors in a fraction of the entire standardizing resistance $R_s$; hence, $R_s'$, and $R_d'$ are the actual values of the respective resistors. Combining Equations 3 and 4:

$$V_{d'} = \frac{E_s}{1 + \frac{[(E_s-1)R_d][1+e_s]}{R_d[1+e_d]}} = \frac{(1+e_d)E_s}{e_d + E_s + e_s E_s - e_s}$$

$$V_d' = \frac{(1+e_d)}{\frac{e_d}{E_s} + 1 + e_s - \frac{e_s}{E_s}} = \frac{1 + e_d}{1 + \frac{e_d - e_s}{E_s} + e_s} \qquad (5)$$

Equation 5 may be expressed in the expanded series:

$$V_d' = (1+e_d)\left[1 - \left(\frac{e_d - e_s}{E_s} + e_s\right) + \left(\frac{e_d - e_s}{E_s} + e_s\right)^2 - (\quad)^3 + \ldots\right]$$

Since the resistance errors are of the order .01% or .0001, the square and higher order terms may be disregarded whereby:

$$V_d' \doteq (1+e_d) - \frac{e_d}{E_s} + \frac{e_s}{E_s} - e_s + \ldots$$

$$\doteq 1 + e_d - \frac{e_d}{E_s} - \frac{(E_s - 1)e_s}{E_s} + \ldots$$

$$\doteq 1 + \frac{(E_s - 1)e_d - (E_s - 1)e_s}{E_s} + \ldots$$

$$\doteq 1 + \frac{(E_s - 1)}{E_s} \times (e_d - e_s) + \ldots$$

where the factor $(E_s - 1)/E_s$ reduces the error factor of $(e_d - e_s)$ by a ratio of about 1/50 because $E_s \doteq 1.02$. For example, an error of .00005 in $e_d$ or $e_s$ alone, or a residual error in $(e_d - e_s)$ of .00005 causes an error in $V_d'$ of .02 (.00005) = 0.000001. Since resistance elements within the specified range are obtainable, the foregoing provides a value of $V_d'$ at 1 volt within an accuracy of .000001 (1 p.p.m.).

If the potentiometer circuit 9 is used to establish or calibrate voltage parameters to a high degree of precision, then the circuit itself must be susceptible to precise calibration. By self-calibration herein, one means ascertaining the amount of deviation of the divider output voltage (the output of the potentiometer circuit at terminals 19-18) as compared to the actual reading of the actual divider decade dial setting. The error, if any, is made up of two components. The first component is a scaling error. The second component is a voltage divider ratio calibration error. Furthermore, the two errors may be individually ascertained, whereby the resultant error is determined by summing the two individual component errors.

If the potentiometer system of FIG. 1 were free of both errors, i.e. assuming a perfect potentiometer circuit with no scaling error and no divider ratio calibration error, the divider output would be exactly equal to the divider dial settings. The linear curve A, FIG. 2, depicts such output, that is to say, free of the foregoing errors, wherein the potentiometer circuit output (ordinate axis) is plotted against the actual dial settings (abscissa). The linear curve B, FIG. 2, depicts the output of the potentiometer characterized by scaling error, but free of the divider ratio error. As seen from the figure, the scaling error is a constant percentage error. Hence, curve B is linear, but deviates from curve A by a constant percentage factor. In selecting resistance values within the tolerances mentioned hereinbefore, the scaling error may be held within the range of two parts per million. The divider ratio error is a component which will vary for each dial setting. Curve C depicts potentiometer output including both errors.

In the following discussion, the scaling error will be ascertained first and then the ratio calibration error will be determined secondly. Were the standard source 24 exactly equal to 1.00000 volt, the scaling error could be easily determined by simply connecting the output of such standard in parallel across terminals 19, 18 of divider 16, place a galvanometer in series with such standard and compare the two voltages. However, it has been indicated that standard 24 has a value of 1.01830 volts. Such voltage is larger than the 1 volt established across divider 16 by the circuit of FIG. 1. Consequently, a resistor 21 of known value is inserted in series with divider 16 for the purpose of calibrating the scaling error.

Figure 1A:
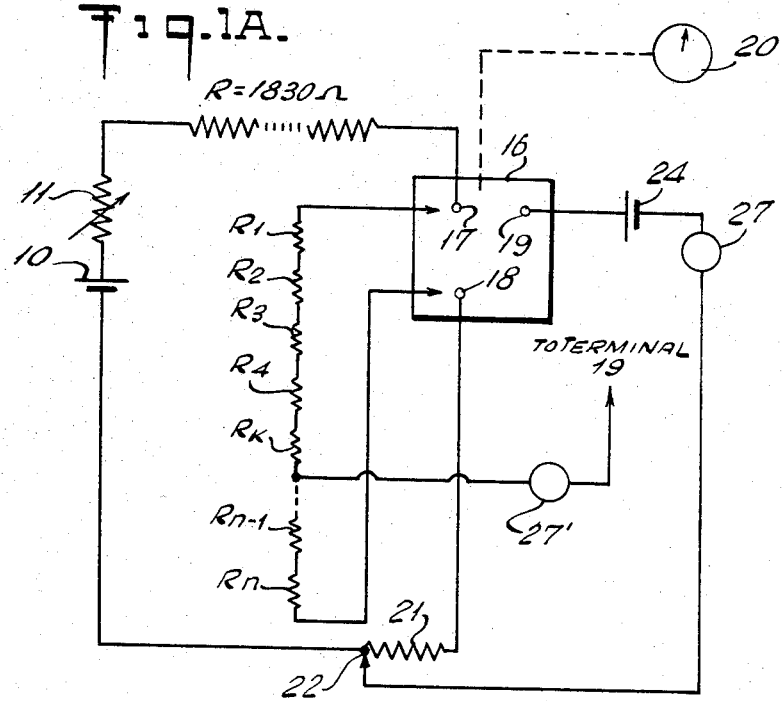
FIG. 1A is a schematic circuit for illustrating the calibration of the potentiometer circuit.

With reference to FIG. 1, a 10K ohm resistor 21 is in series with divider 16. Since the input impedance of divider 16 is 100K ohms with a 1 volt drop across same, resistor 21 will have one-tenth the voltage across divider 16, i.e. 0.1 volt, because the same current flows through divider 16 and resistor 21 during a calibration null. Without disturbing the settings of $$R15 + R14 + R13 + R12 = 1830 \text{ ohms}$$

standard 24 is placed in series with galvanometer 27 and the series combination is connected across the series combination of the output of divider 16 and resistor 21, as indicated in FIG. 1A, i.e. terminal 19 to terminal 22. Dial 20 is then adjusted to null meter 27. Letting $E_p$ equal the voltage output of divider 16 at null; $E_s$ equal the voltage of standard 24, then for galvanometer 27 to null, $$E_s = (E_p + 0.1);$$

or $E_p = (E_s - 0.1)$. If $E_s = 1.01830$ volts, then $E_p = 0.91830$ volt.

The scaling error may be determined by reading the divider dial setting when galvanometer 27 nulls. If there is no scaling error, galvanometer 27 will null at the foregoing stated voltage of $E_p$ and at such setting, the decade dial 20 of divider 16 will read 918300. If there is a scaling error, the divider dial setting at $E_p$ null will not read 918300. Let $D_p$ equal the dial setting of voltage divider 16 for meter null, then the scaling error in volts equal $D_p - (E_s - 0.1)$ and the scale error in fractional parts per million will be:

$$\frac{D_p - (E_s - 0.1)}{(E_s - 0.1)} \quad (6)$$

A 10K ohm resistor for element 21 is not the only null resistance value which may be used for self-calibration of the scaling error. Resistor 21 may have any selected value which will give a definite percentage of voltage across resistor 21 as compared to the voltage across the input to divider 16. For example, a 20K, a 30K, etc. resistor may be used for resistor 21, wherein the voltage across resistor 21 will be 20%, 30%, etc., respectively. Scaling errors for other output values along divided 16 may be determined in similar manner by using a 20K, a 30K, etc. for resistor 21.

The voltage divider error is found by a ratio calibration means. Ratio calibration of the voltage divider may be carried out by connecting a series string of $n$ intercompared resistors across voltage divider terminals 17, 18. Referring to FIG. 1A, divider 16 is shown with a series string of $n$ resistors R1 through R$n$ in parallel across the input side of divider 16, where $$R1 = R2 = R3 \ldots Rn$$

The voltage applied to divider 16 may be the 1 volt applied directly to it by virtue of the circuit of FIG. 1. The output is taken from the string of $k$ resistors at any selected tap point of the $n$ resistors, for example, $R_k$. A galvanometer 27' is connected between the output side 19 of divider 16 and the end of $R_k$. The output of divider 16 is adjusted for a meter null. At null, the voltage at $R_k$ tap point is $V_k = (k/n)(V_d)$, where $V_k$ is the voltage at the $k$ tap point; $n$ is the total number of resistors across the input side of voltage divider 16; $k$ is the total number of resistors across the output side of voltage divider 16; and $V_d$ is the voltage across the input side of voltage divider 16. When the decade dials of divider 16 are set to null galvanometer 27', the difference between the dial setting of the voltage divider and the ratio voltage $V_k$ is the voltage divider ratio calibration correction.

As known in the art, a series of decade resistors can be intercompared to produce a self-calibration system. For example, using a string of twelve series resistors, two of the twelve resistors are used as ratio arms and a third as a comparison standard. A bridge is established between the resistors to self-calibrate all twelve resistors to a relative accuracy of the individual resistors to 1 part per million. The string of resistors then can be interconnected between the input side and the output side to produce sixty-six ratios from the twelve series resistors spanning the ratio values of .0833333 to 1.0000000. The errors in the ratios can be calibrated to within one part in ten million. By first determining the deviations in parts per million of the individual resistors, one can connect a given number in series and add the individual deviations to determine the cumulative deviations in parts per million. Letting $a_1 \ldots a_n$ be the individual deviation in p.p.m. and $b_1 \ldots b_n$ be the cumulative deviation in p.p.m., the ratio error in p.p.m. is:

$$\frac{1}{n}\left[b_k - \frac{k}{n}(b_n)\right]$$

For a more detailed explanation of such calibration techniques, one may refer to the JRL Precision Journal, published by Julie Research Laboratories, Inc. of New York City, vol. IV, No. 1, dated June 1961, "Establishing Ratios To One Part In Ten Million."

The ratio certainty produced by using the $n$ series resistors is found to be one part in ten million. Using the described $n$ series resistors, the calibration of the voltage divider is determined to 1 part per million. The six dials of the voltage divider provide the first six places and the seventh place can be obtained by estimation of the galvanometer deflection.

In the foregoing manner, the ratio calibration of the voltage divider at each selected ratio setting may be determined and by combining the ratio calibration of the voltage divider with the scaling error of the potentiometer circuit, the total potentiometer circuit error is ascertained.

As noted hereinbefore, resistor 21 is used to calibrate the scaling error. The accuracy of the voltage across resistor 21 for determining the scaling error may be ascertained by using a string of eleven resistors of equal value and in series as described in connection with FIG. 1A.

These resistors are connected across the input of voltage divider 16 and resistor 21. Referring to FIG. 1A, the string of eleven resistors would be connected from terminal 17 to terminal 22. The voltage across divider is 1 volt and the voltage desired across the 10K resistor 21 is 0.1 volt. By placing a tap at the first resistor of the string of eleven resistors, a ratio of 1/11 is obtained. The ratio of the 0.1 volt across resistor 21 to the total voltage across resistor 21 plus voltage divider 16, is 0.1/(1+0.1)=1/11. By placing a galvanometer between the tap point of the first resistor of the string of eleven resistors and at the junction 18 end of resistor 21, the deviation of voltage across resistor 21 may be ascertained. To correct a voltage error, if one exists, a small variable resistor may be placed in series with resistor 21 to correct for the foregoing deviation error, which will be indicated by a null on the galvanometer.

A precision voltbox is generally an integral part of a potentiometer circuit 9. The voltbox serves to extend the range of the potentiometer. Reference is made to FIG. 3 which illustrates a voltbox 30 made up of a series of resistors having preselected values of suitable proportions to each other to give ratios, for example, as specified in FIG. 3, i.e. 3 to 1, 10 to 1, 30 to 1, etc. In operation, output terminals 19–18 of divider 16 are connected by respective leads 31, 32 across voltbox terminals "0–1," i.e., across the first resistor R1. A galvanometer 27' is in series with lead 31. A DC source 33 is connected across the outer terminals of voltbox 30. The output of divider 16 is adjusted to provide one volt. Source 33 is adjusted to null meter 27'. This establishes one volt across the first resistor R1 when the output from divider 16 is one volt. Accordingly, three volts is established at terminal 3, ten volts is established at terminal 10, etc. Once voltbox 30 is so calibrated, divider 16 may be disconnected therefrom and voltbox 30 may be used as an extended voltage source.

The ratio of the resistances constituting voltbox 30 may be calibrated by use of divider 16. For example, divider 16 is set to establish a 1 volt output. Source 33 is adjusted to provide 1 volt across the entire voltbox, that is, from terminal "zero" to terminal "1000." Leads 31, 32 are connected respectively to terminals "1000" and "zero" of the voltbox. Meter 27' nulls if there is a 1 volt drop across the entire voltbox, otherwise, source 33 is adjusted to null meter 27'. The decade divider 16 is then adjusted for .333333 and lead 31 is then connected to terminal 300. If the resistors are of proper ratio meter 27' will null, otherwise divider 16 is adjusted to null meter 27' which indicates the deviation error. This may be repeated for other ratios, such as one-tenth, .03, etc. An alternate method of checking the ratio would be to reestablish one volt across R1 of voltbox 30 and then to connect output lead 32 to terminal "30" as indicated by dashed line, and lead 31 to terminal "10" as indicated by dashed line. Divider 16 is set for the ratio of .333333. If the resistances are of proper ratio, meter 27' will null, otherwise, divider 16 is adjusted for null and the deviation error is noted by the decade reading.

FIG. 4 shows the potentiometer circuit 9 including a ganged switch 34 for effecting the arrangements covered in the prior figures. Ganged switch 34 has three blades 34a, 34b, 34c. Each blade is provided with four switch terminals 1 to 4. When the three blades of switch 34 contact respective terminals 1, wiper arm 23 is in series with standard 24, which is in series with null detector 27 and which is in series with the low terminal 18 of divider 16. This depicts the first circuit for establishing one volt across the divider input.

When the three switch blades contact respective terminals 2, detector 27 is in series with divider output 19 and, in addition, detector 27 is in series with the pair of accessible terminals $E_x$ depicted by the two arrow heads at the end of lead lines 31, 32. Line 32 returns to the low terminal 18 of divider 16. This arrangement permits one to measure the unknown voltage parameter across $E_x$, i.e. 31–32, and, in addition, provides the accessible terminals depicted as 31, 32 for calibrating extrapolation means, such as voltbox 30. For example, one of the resistors, such as R1, is connected across leads 31, 32 to make same correspond with the discussion with respect to FIG. 3. It will be noted that when the switch blades are in position to connect with respective terminals 1, the switch blade 34b shorts out accessible terminals $E_x$.

When the switch blades make contact with respective terminals 3, detector 27 and source 24 are in series and this series combination is connected from divider output terminal 19 to junction 22 for calibration of the scaling error.

When the three switch blades are connected to respective terminals 4, detector 27 is connected in series with divider output terminal 19. The other side of detector 27 is available for connection to a tap point along a string of resistors as depicted in FIG. 1A to carry out a ratio error calibration.

Reference is again made to FIG. 3 to show another form of voltbox operation. In this instance, it will be assumed that one wishes to determine with accuracy the unknown EMF value of battery 33. Let us assume that battery 33 is known to be about 35 volts. Accordingly, lead 35 from the positive side of battery 33 is connected to a tap greater than "30." As illustrated in FIG. 3, lead 35 as shown in dashed outline is connected to the "100" tap. Lines 31, 32 from the output of divider 16 are connected across R1 of voltbox 30. Output of divider 16 is then adjusted for a null at meter 27'. The null will occur when divider reads 350000. This means that the voltage from the output of divider 16 is balanced by a .35 volt drop across R1. Since the drop from voltbox terminal "100" to terminal "0" is 100 times that across R1, the unknown battery 33 is measured with accuracy by reading dial 20.

It is intended that all matter contained in the above description or shown in the accompanying drawings shall be interpreted as illustrative and not in a limiting sense.

What is claimed is:

1. A voltage measuring circuit comprising a battery cell of voltage $E_s$, a variable standardized resistance $R_s$; a voltage divider having input and output circuits and means for adjusting the voltage across the output circuit as a function of the voltage across the input circuit, said input circuit having a constant input impedance $R_{in}$; said battery cell, variable resistance and voltage divider input circuit being connected in a series circuit;

wherein the voltage $V_d$, across said divider input circuit is a function of the voltage $E_s$ and a ratio of resistances, with said voltage across said divider input being equal to $$E_s \frac{R_{in}}{R_s + R_{in}}$$

and $$R_s < R_{in}$$

so that the ratio $$\frac{R_s}{R_{in}} \times 100$$

is less than about 2%;

a null meter; a standard voltage source; said null meter and said standard voltage source being connectable in series across $R_s$ and the input circuit of said voltage divider for calibration, and means connected to said voltage divider output and connectable to said null meter and a voltage to be measured for enabling the voltage appearing across said voltage divider output circuit to be used in determining said voltage to be measured.

2. A voltage measuring circuit as defined in claim 1 and further including a plurality of resistors connected in series across said voltage divider input circuit, and means for selectively connecting a null meter between said voltage divider output circuit and a plurality of taps off said resistor series, whereby the positions of said adjusting means which null said null meter for respective connections of said null meter to said taps provide an indication of the voltage divider ratio calibration error.

3. A voltage measuring circuit as defined in claim 1 and further including a volt box divider comprising a plurality of resistors having two end taps and a plurality of intermediate taps, an adjustable voltage source connected across said volt box taps, and means for selectively connecting a null meter between a plurality of said taps of said volt box and said voltage divider output circuit, whereby the nulling of said null meter for a particular setting of said adjustable voltage source provides an indictaion of the magnitude of said voltage source dependent upon the particular one of said taps to which said null meter is connected.

4. A voltage measuring circuit as defined in claim 1, and further including a volt box divider comprising a plurality of resistors having two end taps and a plurality of intermediate taps, a voltage source connected across taps of said volt box, and means for selectively connecting a null meter between said voltage divider output circuit and a volt box tap, whereby the position of said adjusting means is an indication of the calibration error of said volt box divider.

5. A voltage measuring circuit as defined in claim 1 further including, resistor regulating means series connected with said battery cell in said current loop for regulating current flow along said loop.

6. A voltage measuring circuit as defined in claim 1 further including, second resistor means characterized by a resistance value of a predetermined percentage of the input resistance of said voltage divider, said second resistor means being connected in series with a common input and output terminal of said voltage divider, means for connecting said standard source and null detector in series, and for connecting said last-mentioned series combination in parallel across said resistor means and the output of said voltage divider for calibartion of the potentiometer circuit scaling error.

7. A voltage measuring circuit as defined in claim 1 and further comprising, voltage extrapolation means and means for connecting said voltage extrapolation means to said voltage divider output.

8. A precision calibration circuit comprising,
a voltage divider having a plurality of terminals forming an input and output circuit, said divider having a fixed input impedance, and adjustable transfer ratio means for accurately adjusting the voltage across the output circuit as a function of the voltage across the input circuit,
self-calibration means for calibrating the errors of the said voltage divider at a plurality of selected ratio settings,
means for selectively connecting the terminals of said voltage divider to said self-calibration means,
a volt box divider comprising a plurality of resistors having two end taps and a plurality of intermediate taps, switching means to selectively connect a tap of said volt box to the output circuit of said voltage divider,
a voltage source selectly connectable across said volt box taps, and
a null meter selectly connectable between the adjustment means of said voltage divider and a selected tap of said volt box, whereby the position of said adjusting means is an indication of the calibration of said volt box.

9. A precision calibration circuit as in claim 8, wherein the said fixed impedance voltage divider has at least two input terminals and an output terminal and the self-calibration means comprises,
a plurality of resistors $R_1$ through $R_n$ having taps and connected in series,
first means to selectively connect the end taps of resistors $R_1$ and $R_n$ to the input terminals of said voltage divider,
second means to selectively connect a first cross-arm from said output terminal to one of the intermediate taps of resistors $R_1$ through $R_n$, a null indicator means connected in the said first cross-arm,
a second cross-arm connecting said two input terminals of said voltage divider, and
a battery cell connected in the said second cross-arm.

10. A precision calibration circuit as in claim 8 and further comprising,
a variable standardized resistance connectable in series with a battery cell,
means to selectively connect said series of cell and standardized resistance in the input circuit of said fixed impedance voltage divider,
a standard voltage source, and
means to selectively connect a null meter and said standard source in series with the said input circuit of said voltage divider.

References Cited
UNITED STATES PATENTS

| | | | |
|---|---|---|---|
| 819,355 | 5/1906 | Leeds, et al. | 324—63 X |
| 1,912,242 | 5/1933 | Albert | 324—63 |
| 2,803,799 | 8/1957 | Siegel | 324—98 X |

ARCHIE R. BORCHELT, *Primary Examiner.*

E. KARLSEN, *Assistant Examiner.*

U.S. Cl. X.R.
323—94; 324—63, 74